(12) United States Patent
Deutsch et al.

(10) Patent No.: US 6,724,885 B1
(45) Date of Patent: Apr. 20, 2004

(54) AUTOMATIC CALL DISTRIBUTION CENTER WITH QUEUE POSITION RESTORATION FOR CALL-BACK CUSTOMERS

(75) Inventors: Douglas A. Deutsch, Aurora, IL (US); David B. Smith, Hinsdale, IL (US); Matthew R. Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/540,132

(22) Filed: Mar. 31, 2000

(51) Int. Cl.[7] .......................... H04M 1/64; H04M 3/00; H04M 5/00; H04M 3/42
(52) U.S. Cl. ................. 379/265.02; 379/88.2; 379/209.01
(58) Field of Search .................. 379/309, 209.01, 379/265.02, 88.2; 370/259

(56) References Cited

U.S. PATENT DOCUMENTS

| | | | | |
|---|---|---|---|---|
| 5,040,208 A | * | 8/1991 | Jolissaint | 379/209.01 |
| 5,185,782 A | * | 2/1993 | Srinivasan | 379/265.02 |
| 5,627,884 A | * | 5/1997 | Williams et al. | 379/88.2 |
| 5,903,642 A | * | 5/1999 | Schwartz et al. | 379/309 |
| 6,049,603 A | * | 4/2000 | Schwartz et al. | 379/309 |
| 6,141,328 A | * | 10/2000 | Nabkel et al. | 370/259 |

* cited by examiner

Primary Examiner—Ahmad F. Matar
Assistant Examiner—Thjuan P Knowlin

(57) ABSTRACT

A novel Automatic Call Distribution (ACD) Center allows an on-hold customer, upon learning of an unacceptable waiting time for service, to accept a date- and time-stamped "Priority Token," and then end the current telephone call. If the customer calls the ACD Center back within a predefined Token Window (stored in the ACD system memory and announced to the customer as he/she is receiving the Priority Token), as indicated by the automatic presentation of the Priority Token, the customer is placed back into the queue position he/she had during the previous call, or if that queue position has already passed, the customer is placed at the top of the queue to be served by the next available agent. The Priority Token stored in the ACD system memory includes the Directory Number in the preferred embodiment for ease of detection of calls incoming to the ACD Center. In a more advanced version of the present invention, the customer also receives a multi-digit Priority Code corresponding to the Priority Token. The Priority Code allows the customer to make a return telephone call from a different Directory Number, key-in a feature activation code (e.g., "*42") followed by the Priority Code, and be returned to his/her previous queue position.

12 Claims, 2 Drawing Sheets

Figure 1:
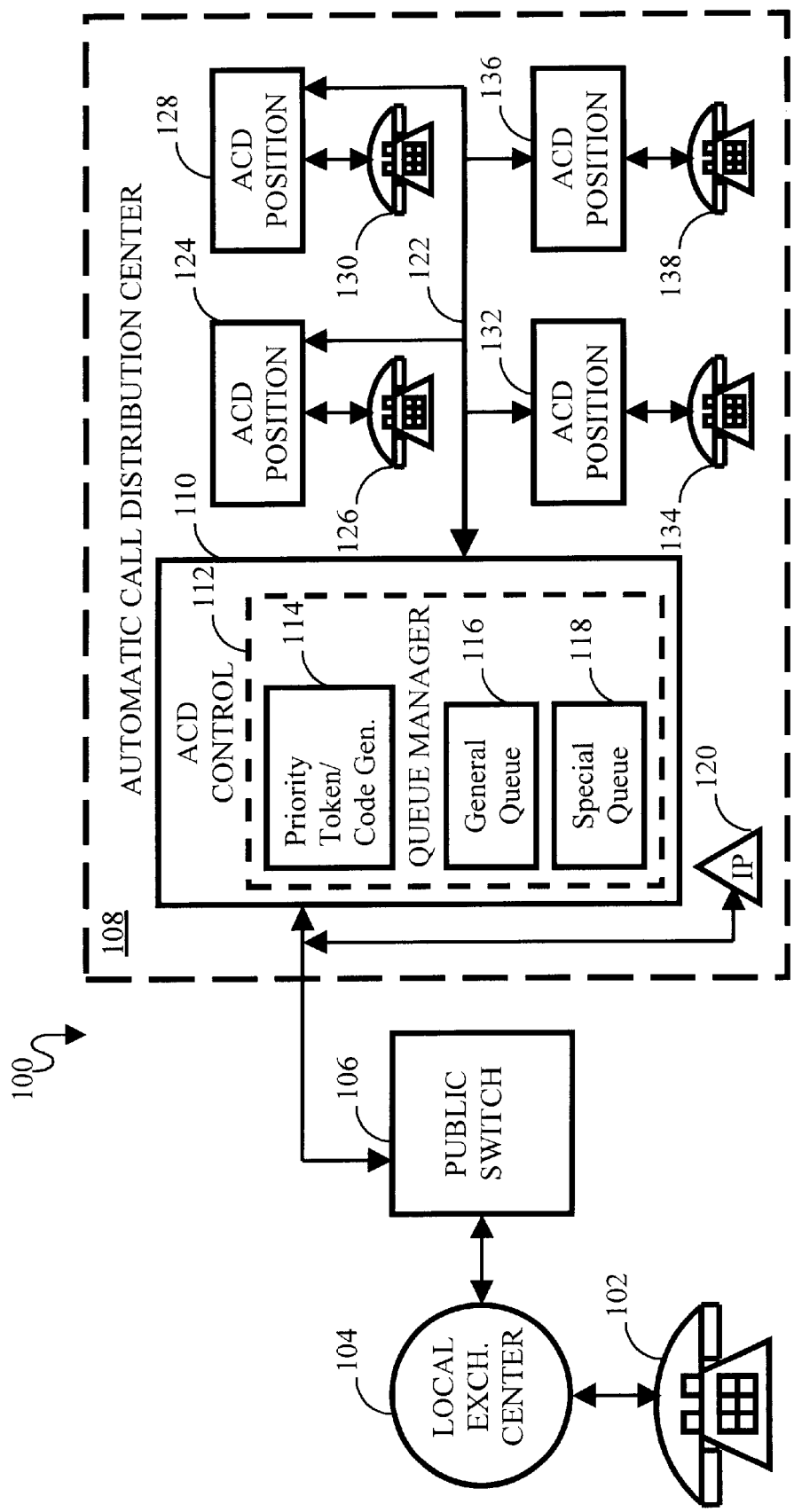

AUTOMATIC CALL DISTRIBUTION CENTER WITH QUEUE POSITION RESTORATION FOR CALL-BACK CUSTOMERS

BACKGROUND OF THE INVENTION

1. Field of the Invention

The present invention generally relates to Automatic Call Distribution systems used in telephone call centers. More particularly, the present invention relates to improving the queue management and customer satisfaction in telephone call centers with Automatic Call Distribution systems.

2. Background of Related Art

Telephone call centers (or call centers) are networked groups of telephone operators or "agents" that provide customer service for telephone callers. Call centers can be in many different forms, from large Operator Service Systems (OSSs) under the control of telephone companies to smaller private ones such as corporate customer service centers and telemarketing groups.

An important function of a call center is to provide efficient service to all customers, including timely and satisfactory handling of all received calls. Prior art automatic call distribution (ACD) systems are software-hardware hybrids for helping to efficiently switch incoming telephone calls to suitable and available operators.

Because of limited resources, such as the number of available agents, all customers may not be able to receive immediate customer service. Customers are placed "on hold" in a queue while they await customer service.

Unacceptable hold times without service lead to wasted customer time, call hang-ups, and low customer satisfaction. What is sorely needed, but not addressed by prior art ACD systems is a flexible queue management system that allows a customer to maintain a queue position without having to remain on hold for marathon time periods, while not requiring an increase in call center resources.

SUMMARY OF THE INVENTION

In view of the above-identified problems and limitations of the prior art, the present invention provides a queue management method for the management of calls placed in the queue of an Automatic Call Distribution (ACD) system. The method at least includes the steps of assigning each telephone call received by the ACD system, a queue position corresponding to an order of calls to be serviced, receiving a first telephone call from a Calling Party, placing the Calling Party on hold, and providing the Calling Party with an opportunity to cause to be established in memory, a "Priority Token," the Priority Token at least including calling party identity indicia, date and time indicia, and the Calling Party's queue position.

The method also at least includes the steps of receiving a second telephone call from the Calling Party, checking the memory of the ACD system for a Priority Token corresponding to the Calling Party, and placing the second telephone call in the queue position established during the first telephone call according to the Priority Token.

The present invention also provides an ACD system at least including an ACD control unit adapted to control the overall operation of the ACD, receive telephone calls, and place calling parties on hold, a plurality of ACD position stations adapted to allow agents to service telephone calls via telephonic devices coupled thereto, and a queue manager adapted to assign each telephone call received by the ACD system, a queue position corresponding to an order of calls to be serviced.

The system also at least includes ACD memory, a Priority Token Generator adapted to generate, during a first telephone call from a Calling Party, a "Priority Token," the Priority Token at least including calling party identity indicia, date and time indicia, and the Calling Party's queue position. The ACD control unit is adapted to, during a second telephone call from the Calling Party, check the ACD memory for a Priority Token corresponding to the Calling Party, and place the second telephone call in the queue position established during the first telephone call according to the Priority Token.

BRIEF DESCRIPTION OF THE DRAWING FIGURES

Figure 2:
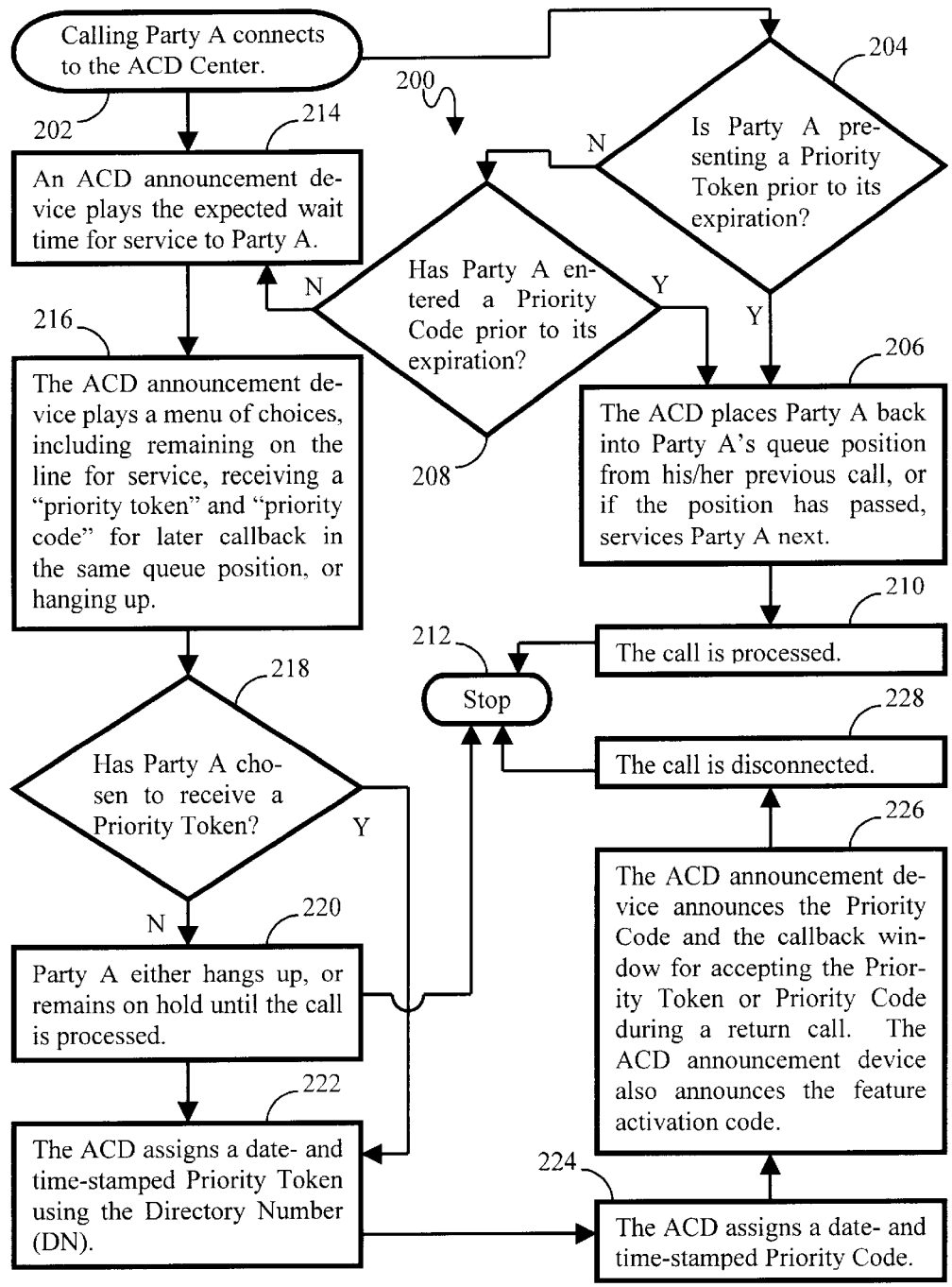

Features and advantages of the present invention will become apparent to those skilled in the art from the description below, with reference to the following drawing figures, in which:

FIG. 1 is a schematic block diagram illustrating the present-inventive Automatic Call Distribution Center; and FIG. 2 is a flowchart detailing the algorithm steps used to process a call to the Automatic Call Distribution Center with respect to queue management, Priority Tokens and Priority Codes.

DESCRIPTION OF THE PREFERRED EMBODIMENTS

FIG. 1 shows a telecommunication system 100 embodying the present-inventive Automatic Call Distribution (ACD) and queue management systems. The system 100 nominally includes a number of Local Exchange Centers or Local Exchange Carriers (LECs) such as the one 104, for switching telephone customers generically and graphically represented by the telephone 102 in FIG. 1.

A public switch 106 connects a customer to many Destination Numbers, as is known in the art, including the present-inventive ACD Center 108. Along with several ACD position stations 124, 128, 132, 136 which connect customers to telephone agents represented by the telephones 126, 130, 134 and 138, the preferred embodiment of the ACD system 108 also includes an ACD Control Unit 110 for controlling the overall operation of the ACD Center, and an Intelligent Peripheral (IP) 120, responsible for collecting Dual Tone Multi-Frequency (DTMF) alphanumeric digits input by a customer from a telephone keypad, and acting as an announcement device to audibly transmit information to the customer. In the preferred embodiment, the IP 120 is also capable of decoding addresses from multiple sources such as data networking devices, and is not limited to voice information devices. Besides Directory Numbers, such addresses include for example, Transmission Control Protocol/Internet Protocol (TCP/IP) and Media Access Control (MAC) addresses. Those skilled in the art will appreciate that any number of ACD position stations can be included in the ACD Center 108.

A queue manager 112 is responsible for both assigning and managing queue positions to customers calling the ACD Center. Telephone customer calls are serviced in the order of their queue position. However, in contra-distinction with the prior art, the present-inventive ACD Center allows a customer, upon learning of the approximate wait time for service, to choose to exit the system, but make a later telephone call, while not losing the queue position established in the original telephone call. Alternative to being placed back in the same queue with the same queue position on a callback, a callback customer can be placed in a separate priority queue on callback, as more fully discussed infra.

Upon learning of the approximate wait time for service, a customer can elect to receive a "Priority Token" to "save his/her place in line," while the customer is free to disconnect the call and call back within a specified period of time ("Token Window"). The Priority Token is stored in memory, and includes an indicator of the token customer's identity, the queue position when the token was received, and the date and time the token were established. The preferred embodiment uses the customer's Directory Number (DN) as the customer identifier. However, other attributes can be used, such as a Calling Line Identifier (or Calling Line Identity or Calling Line Identification).

When the customer calls back, the ACD Control Unit 110 compares the Directory Number of the customer with those stored in memory and associated with Priority Tokens. If a match is found, the ACD Control Unit compares the information in the Priority Token having the same Directory Number with information such as the current date and time. If the return call has occurred within the Token Window, the customer is given his/her previous queue position (which is likely closer to the top of the queue, and thus closer to having the call serviced than would be a newly assigned queue position). The Token Window is also a matter of design choice, and may have a large range of values, such as ten (10) minutes, for example.

If the customer with a Priority Token calls back within the Token Window, but the system has nonetheless passed the queue position assigned (e.g., the calls ahead of the customer were much shorter in duration than average, or there were an unusual number of hang-ups, or a temporary or permanent increase in resources has occurred), the customer is placed in the priority queue and processed as explained, infra.

While the particular queue structure is not of utmost importance, given the essence of the present invention, a general queue 116 and a special queue 118 can be used. The general queue includes all of the queue positions created during a cycle. All customers are placed in the general queue unless they are callback customers with a valid, unexpired Priority Token in cases where their previous queue position has been serviced, but the Token Window has yet to expire. Such callback customers are placed in the special queue as they are received. The calls are processed by alternating between the general queue and the special queue, although it will be appreciated by those skilled in the art that other apportioning methods for processing the customers in both queues can be used, depending on design choice.

An additional benefit of using a multiple queue system is the ability to dynamically reassign agents handling calls from the general queue to handle calls in the special queue when needed. This aids the system in meeting announced call processing times. The relative number of agents assigned to each queue can be used in estimating the approximate wait time announced to each customer.

Another embodiment of the present invention can be used to allow a Priority Token customer to call back from a telephone not associated with the Directory Number stored as part of the Priority Token information. For example, a customer might telephone the call center from a residential telephone, but desire to call back later using a different telephone, such as a cellular telephone. In this case the Directory Numbers will be different, leading the ACD Center to erroneously conclude that the particular customer had not previously called.

To rectify this problem the ACD system can also assign a "Priority Code" linked to the Priority Token. The Priority Code is a unique string of digits established and stored with the Priority Token, and also announced to the customer when he/she acquires a Priority Token. For example, the Priority Code can be a pseudo-randomly generated four-digit code that can be input during a callback with DTMF signals from an alphanumeric telephone keypad. The ACD system places a callback customer in the previous queue position or in a priority queue position (when the position has passed, but the token window is still open) based upon the customer's entry of the Priority Code, rather than matching his/her Directory Number with the DN stored in the Priority Token.

A customer can activate the queue position restoration feature of the present invention by, upon connecting to the ACD Center, first entering a feature activation code (e.g., "*42"), followed by a valid, unexpired Priority Code when prompted.

The present invention will now be further explained with reference to the queue management algorithm 200 in FIG. 2. The algorithm 200 contains the basic steps for implementing a queue position restoration method using either Priority Tokens or Priority Codes.

To begin the algorithm 200, a Calling Party ("Party A") is connected to the ACD Center in a manner well known in the art (Step 202). The ACD Center determines if Party A's Directory Number matches any of those stored in memory associated with unexpired Priority Tokens (Step 204). If Party A is presenting a Priority Token (as identified by the Directory Number), the ACD system places Party A's telephone call back in his/her previous position in the general queue (Step 206). If Party A's previous queue position was already serviced during Party A's absence (although still within the predefined Token Window), Party A's telephone call is place in the priority queue to receive priority processing (also Step 206). The call is processed and the algorithm halted in Steps 210 and 212.

If the ACD system does not recognize Party A's Directory Number as indicating the presence of a valid Priority Token, it prompts Party A for a feature activation code, followed by a Priority Code (Step 208). If a valid, unexpired Priority Code has been input, the algorithm advances to Step 206 to give the customer either queue position restoration or priority queue position status. If not, the algorithm advances to Step 214, where the Intelligent Peripheral (or other announcement device) announces to Party A, the expected wait time before the call will be serviced.

The announcement device plays a menu from which Party A can choose several options, including remaining on hold for service, receiving an assigned Priority Token and Priority Code for later callback, or hanging up (Step 216). If Party A does not choose to receive a Priority Token, he/she can either stay on the line for eventual service, or hang up (Steps 218, 220 and 212). If Party A chooses to receive a Priority Token and Priority Code, the ACD system assigns a Priority Token, using the Directory Number, the current date and time, and the current queue position (Step 222). The ACD system also assigns and a Priority Code linked to the Priority Token to provide the customer with the option of making a return call from a different telephone line, if desired (Step 224).

The announcement device plays the following information for the customer: the digits making up the Priority Code; the amount of time in the Token Window (or a time and date before which, the return call must be made); and the alphanumeric digits representing the feature activation code (Step 226). The call is then disconnected to end the algorithm (Steps 228 and 212).

Alternative to the approach above where no priority code is given, a customer on hold can be automatically assigned a priority token simply by hanging up. This can be preceded by an announcement such as: "Your approximate wait time is__minutes. If you would like to call back between__and__ minutes, your call will be given priority treatment. You must, however, call back from the same telephone number to receive this priority service."

In yet another embodiment of the present invention, the ACD system can automatically call the customer back when the previous queue position is within a predefined number of positions from the top of the queue. When the connection is complete (i.e., the customer goes off-hook with customer premise equipment (CPE) connected to the dialed telephone line), the customer is then entered back into the previous queue position. The ring of the automatic callback call can contain a distinctive pattern (i.e., "distinctive ringing") to audibly indicate that the incoming call is a return call from an ACD system. As a backup feature, a failed automatic return call attempt might be followed by a call to a pager, or an e-mail message (which is valuable when customers are using the telephone line for computer communication, such as via the Internet), or any other alerting method, to prompt the customer to call the ACD system.

It should be appreciated by prospective administrators of the present-inventive ACD system, that much of the information used and monitored by the present invention can be employed for more efficient resource management and planning for the system. With respect to Priority Tokens, of great interest to a system administrator are information such as the number of tokens assigned during particular time periods, the number of the aforementioned tokens received during return calls, the number of tokens which expire without use, the average wait time of return call customers with tokens, and the number of active agents assigned to customers with tokens during a given time period. Other monitored information which may be useful in efficient system administration includes the number of ACD system return calls, the average reduction in return call wait time, and the number of failed ACD return calls.

Variations and modifications of the present invention are possible, given the above description. However, all variations and modifications which are obvious to those skilled in the art to which the present invention pertains are considered to be within the scope of the protection granted by this Letters Patent.

For example, the present invention is not limited to telephone call centers, but is applicable to any type of customer contact center using any type of telecommunication means including but not limited to telephones, on-line communication devices such as computers, radio frequency transceivers, and interactive television. The contact method is not limited to telephone calls, but may be in the form of other electronic means, including e-mail and other digital messaging, as well as chat room and other forms of real-time digital communication. Further, "agent" is hereby broadly defined to include any sort of organic or inorganic entity or instrumentality capable of processing customer communication needs.

What is claimed is:

1. A method for the management of calls in an automatic call distribution system having a queue, comprising the steps of:

receiving a call from a caller;

assigning said caller a queue position corresponding to an order of calls to be serviced;

placing said caller on hold;

establishing in memory a priority token for said caller, said priority token comprising caller identity indicia, date and time indicia, and said caller's queue position, said caller identity indicia comprising at least one of a directory number, a media access control number, a transmission control protocol/internet protocol address, and a calling line identifier;

disconnecting the caller from said call distribution system;

automatically placing a return call to said caller according to said caller identity indicia when said queue position established during said call is within a predetermined number of positions from the top of said queue; and upon connecting with said caller, placing said caller on hold and in the queue position established during said call according to said priority token.

2. The method in claim 1, wherein said return call includes a distinctive ringing pattern.

3. The method in claim 1, further comprising the step of announcing to said caller an estimated holding time.

4. The method in claim 1, further comprising the step of receiving a feature activation code entered by said caller prior to said placing step.

5. The method in claim 4, further comprising the steps of:

receiving a priority code entered by said caller; and performing said placing step after receiving said priority code from said caller.

6. The method in claim 5, further comprising the steps of:

providing said caller with a priority code corresponding to said priority token;

during said return call receiving a feature activation code entered by said caller; and during said return call receiving a priority code entered by said caller;

wherein said placing step is performed after said feature activation code and said priority code are received from said caller.

7. A system for the management of calls in an automatic call distribution network having a queue, comprising:

means for receiving a call from a caller;

means for assigning said caller a queue position corresponding to an order of calls to be serviced;

means for placing said caller on hold;

means for establishing in memory a priority token for said caller, said priority token comprising caller identity indicia, date and time indicia, and said caller's queue position, said caller identity indicia comprising at least one of a directory number, a media access control number, a transmission control protocol/internet protocol address, and a calling line identifier;

means for disconnecting the caller from said call distribution network;

means for automatically placing a return call to said caller according to said caller identity indicia when said queue position established during said call is within a predetermined number of positions from the top of said queue; and means for connecting with said caller, placing said caller on hold and in the queue position established during said call according to said priority token.

8. The system in claim 7, wherein said return call includes a distinctive ringing pattern.

9. The system in claim 7, further comprising means for announcing to said caller an estimated holding time.

10. The method in claim 7, further comprising means for receiving a feature activation code entered by said caller.

11. The system in claim 10, further comprising:

means for receiving a priority code entered by said caller; and means for performing said placing step after receiving said priority code from said caller.

12. The system in claim 11, further comprising:

means for providing said caller with a priority code corresponding to said priority token;

means for receiving a feature activation code entered by said caller during said return call; and means for receiving a priority code entered by said caller during said return call.

* * * * *